United States Patent
Sadacharam et al.

(10) Patent No.: US 11,249,798 B1
(45) Date of Patent: Feb. 15, 2022

(54) PERSONALIZED TIMEOUT CONTROL

(71) Applicant: INTERNATIONAL BUSINESS MACHINES CORPORATION, Armonk, NY (US)

(72) Inventors: Saravanan Sadacharam, Chennai (IN); Vijay Ekambaram, Chennai (IN); Vijay Kumar Ananthapur Bache, Bangalore (IN); Jhilam Bera, Bangalore (IN); Ranajoy Paul, Kolkata (IN); Rahul Roy, Kolkata (IN); Biswanath Mukherjee, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 17/022,997

(22) Filed: Sep. 16, 2020

(51) Int. Cl.
*G06F 9/48* (2006.01)
*G06F 9/451* (2018.01)

(52) U.S. Cl.
CPC .............. *G06F 9/485* (2013.01); *G06F 9/451* (2018.02)

(58) Field of Classification Search
CPC ...... G06F 9/451; G06F 9/485; G06F 11/0757; H04L 69/28
See application file for complete search history.

(56) References Cited

U.S. PATENT DOCUMENTS

| | | | |
|---|---|---|---|
| 4,855,736 A | 8/1989 | Hsu | |
| 6,526,433 B1 | 2/2003 | Chang et al. | |
| 7,493,394 B2 | 2/2009 | Zavalkovsky et al. | |
| 7,516,195 B2 | 4/2009 | Collet et al. | |
| 7,728,316 B2 | 6/2010 | Fadell et al. | |
| 7,953,870 B1* | 5/2011 | Reeves | H04L 67/02 709/228 |
| 8,064,647 B2 | 11/2011 | Bazakos et al. | |
| 8,793,359 B1 | 7/2014 | Fiebig et al. | |
| 8,966,487 B1* | 2/2015 | Leonard | G06F 9/54 718/101 |
| 9,357,921 B2 | 6/2016 | Chang et al. | |
| 9,710,302 B2 | 7/2017 | Bates et al. | |
| 10,387,793 B2 | 8/2019 | Allen et al. | |
| 2018/0157528 A1* | 6/2018 | Gigante | G06N 7/005 |
| 2018/0285286 A1* | 10/2018 | Srikanth | G06F 13/1673 |

(Continued)

FOREIGN PATENT DOCUMENTS

| | | |
|---|---|---|
| WO | 2014116968 | 1/2014 |
| WO | 2016144304 | 9/2016 |

OTHER PUBLICATIONS

Sooden et al., "A Dynamic Hybrid Timeout Method to Secure Flow Tables Against DDoS Attacks in SDN", IEEE, Dec. 15-17, 2018, 6 pages.

(Continued)

*Primary Examiner* — Brian W Wathen
(74) *Attorney, Agent, or Firm* — Brian Restauro; Andrew D. Wright; Roberts Calderon Safran & Cole, P.C.

(57) ABSTRACT

A computer-implemented method includes: determining, by a computer device, user behavior with an application; determining, by the computer device, a criticality of the application to a user; and changing, by the computer device, a hardcoded timeout parameter of the application into a dynamic timeout parameter based on the determined user behavior and the determined criticality of the application.

20 Claims, 9 Drawing Sheets

(56) References Cited

U.S. PATENT DOCUMENTS

2020/0186455 A1* 6/2020 Lokhandwala ....... H04L 43/103
2021/0168211 A1* 6/2021 Trim ...................... H04L 67/14

OTHER PUBLICATIONS

Metrouh et al., "Flexible Web services integration: a novel personalised social approach", Journal of Experimental & Theoretical Arlilicial Intelligence, Jan. 29, 2018, 17 pages.
Unknown, "Handling timeouts", NoEQUAL, downloaded Nov. 29, 2019, 5 pages.
Mell et al., "The NIST Definition of Cloud Computing", NIST, Special Publication 800-145, Sep. 2011, 7 pages.

* cited by examiner

PERSONALIZED TIMEOUT CONTROL

BACKGROUND

Aspects of the present invention relate generally to application access and, more particularly, to personalized timeout control systems and processes.

Designers create visual designs in view of various factors, such as user interaction patterns, easiness, and application understanding, amongst other factors. Accordingly, visual designs consider user interaction.

SUMMARY

In a first aspect of the invention, there is a computer-implemented method including: determining, by a computer device, user behavior with an application; determining, by the computer device, a criticality of the application to a user; and changing, by the computer device, a hardcoded timeout parameter of the application into a dynamic timeout parameter based on the determined user behavior and the determined criticality of the application.

In another aspect of the invention, there is a computer program product including one or more computer readable storage media having program instructions collectively stored on the one or more computer readable storage media. The program instructions are executable to: determine user behavior with an application; determine a criticality of the application to the user; change a hardcoded timeout parameter of the application into a dynamic timeout parameter based on the determined user behavior and the determined criticality of the application; and update the dynamic timeout parameter.

In another aspect of the invention, there is system including a processor, a computer readable memory, one or more computer readable storage media, and program instructions collectively stored on the one or more computer readable storage media. The program instructions are executable to: determine user behavior with an application; determine a criticality of the application to the user; change a hardcoded timeout parameter of the application into a dynamic timeout parameter based on the determined user behavior and the determined criticality of the application; and update the dynamic timeout parameter.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
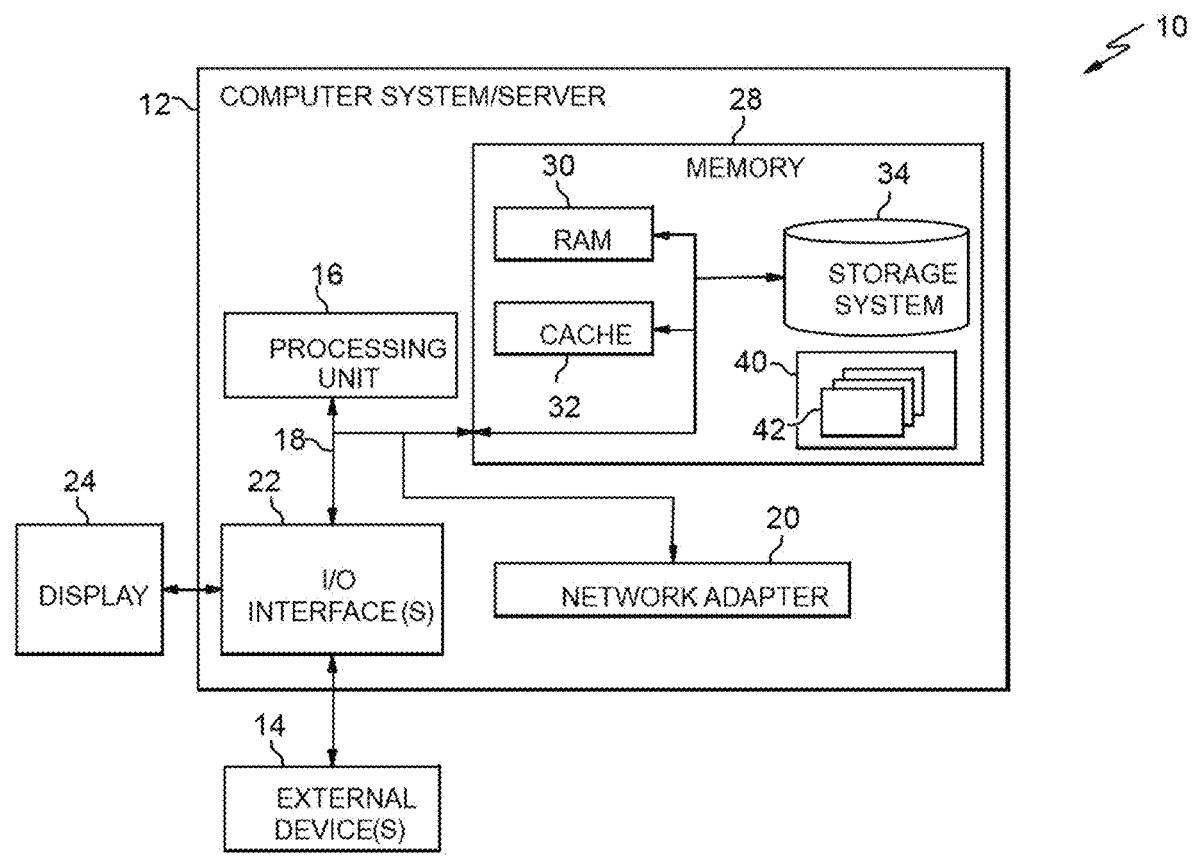
FIG. 1 depicts a cloud computing node according to an embodiment of the present invention.

Aspects of the present invention relate generally to application interaction and, more particularly, to personalized timeout control systems and processes. In embodiments, a personalized timeout control system accounts for a user's interaction behavior with respect to an application. In view of the user's interaction behavior, the personalized timeout control system determines to dynamically change a hardcoded timeout parameter of the application. Accordingly, in response to changing the hardcoded timeout parameter, the personalized timeout control system force-exits the application during runtime in view of the dynamic timeout parameter. In further embodiments, the personalized timeout control system applies a user contextual analysis to determine a criticality of the application to the user for scaling of the dynamic timeout parameter with respect to force-exiting the application. In this way, the personalized timeout control system provides an end-user based solution which accounts for user interaction behavior and application criticality.

Application timeout solutions are static and pre-configured in nature based upon a logged-in user's inactivity for that specific application. However, these application timeout solutions have the following concerns: a) an additional user is not allowed to access the application because of an already logged-in but inactive user (e.g., when there is significant network traffic on the application); and b) a lack of resource optimization. Further, the static timeout solutions work with fixed time intervals without having any cognitive algorithms. Accordingly, a session of the user stays open, even if the user is not actively working within the application. This creates problems for parallel users because there is relatively more load on the application system, thereby increasing resource utilization and computational requirements. This increased load also slows down the network for parallel users looking to use the application, effectively causing timeouts for these parallel users. As an example, a user in a medical situation is requesting transportation through an application, but is getting a waiting response from the application. The user can cancel the request by closing the application or by reaching a set time value hardcoded into the application by the application developer. However, the hardcoded value for the timeout parameter is constant. Accordingly, irrespective of all scenarios, every user has to wait for a certain time which is predefined in the application by the application developer. While this timeout parameter is acceptable for users who are not in an emergency situation, it is problematic for users who want a response from the application immediately.

Embodiments of the present disclosure include a method and system for applying behavioral analytics on user interaction patterns with respect to web services of an application, and thereby classifying a tolerance level of the user in view of the behavioral analytics. In embodiments, dynamically setting of the hardcoded timeout parameter (which controls the force-exit of web service execution) at runtime based on user personalized profiles (e.g., user tolerance and application criticality with respect to the user) and user behaviors (e.g., tap events controlling the force-exit, user inactiveness, health context and workflow progress) by coupling the application with a personalized timeout control-software development kit (PTC-SDK) to intercept the web-service requests control path for controlling the hard-coded timeout parameter programmatically at runtime. In embodiments, the PTC-SDK is added to the application for personalizing the behavior of the web-service requests. In further embodiments, a PTC-SDK of one device talks with other PTC-SDKs of other devices (hitting the same backend) to estimate server overload timeslots and automatically shorten the timeouts to save the user unnecessary waiting time periods. In this way, the systems and processes described herein allow for the practical application of preventing the user from spending unnecessary time waiting for a response from an application when the user instead is able to utilize that time for more beneficial purposes. For example, if the user is experiencing a medical situation and is waiting for a response from a ride-sharing application, the systems and processes described herein allow the user to utilize another ride-sharing application in response to the shortened timeout.

Implementations of the invention allow for improvements to a functioning of a computer device by addressing logged-in but inactive users which increase network traffic and cause a lack of resource optimization for the computer device. In embodiments, the PTC-SDK system provides these benefits by automatically shortening a preset value of time for a timeout, thereby preventing unnecessary waiting times for the user and terminating the application for logged-in but inactive users. In embodiments, the PTC-SDK system uses behavioral analytics on user interaction patterns with respect to web services of an application, and classifies these analytics in view of tolerance levels of the user. Further, the PTC-SDK system applies a user contextual analysis to discover a criticality of the application to the user. In embodiments, for a first rule, the PTC-SDK system determines the dynamic timeout parameter based on the tolerance of the user and the criticality of the application. In embodiments, for a second rule, the PTC-SDK system allows for peer-to-peer communications between different PTC-SDKs running on different devices to estimate whether the current time-out setting has a possibility of getting a result back from the application. In embodiments, for a third rule, the PTC-SDK also tracks user inputs at runtime to override the dynamic timeout parameter. In embodiments, for a fourth rule, the PTC-SDK tracks users activeness with respect to the application to override the dynamic timeout parameter. In this way, the PTC-SDK system allows for improvements to a functioning of a computer device by decreasing the network traffic to the computer device, thereby reducing the load on the computer device.

Implementations of the invention also provide a practical application of reducing network traffic and increasing resource optimization of a computer device by addressing logged-in but inactive users of an application. In embodiments, the PTC-SDK system provides these benefits by automatically shortening a preset value of time for a timeout, thereby terminating the application for logged-in but inactive users prior to the preset value of time. In embodiments, the PTC-SDK system uses behavioral analytics on user interaction patterns with respect to web services of an application, and classifies these analytics in view of tolerance levels of the user. Further, the PTC-SDK system applies a user contextual analysis to discover the criticality of the application to the user. In embodiments, for a first rule, the PTC-SDK system determines the dynamic timeout parameter based on the tolerance of the user and a criticality of the application. In embodiments, for a second rule, the PTC-SDK system allows for peer-to-peer communications between different PTC-SDKs running on different devices to estimate whether the current time-out setting has a possibility of getting a result back from the application. In embodiments, for a third rule, the PTC-SDK also tracks user inputs at runtime to override the dynamic timeout parameter. In embodiments, for a fourth rule, the PTC-SDK tracks users activeness with respect to the application to override the dynamic timeout parameter. In this way, the PTC-SDK system allows for reducing network traffic based on user personalized profiles and user behaviors.

In addition, the steps of the PTC-SDK system are unconventional. In embodiments, the PTC-SDK implements steps for: a) using behavioral analytics on user interaction patterns with respect to web services of an application; b) classifying a tolerance level in view of these behavioral analytics; c) applying a user contextual analysis to discover a criticality of the application with respect to the user; d) determining the dynamic timeout parameter based on the user tolerance and application criticality with respect to the user; e) creating peer-to-peer communication between PTC-SDKs running on different devices for estimating whether the current time-out setting has high probability to get a result back from the application; f) tracking user inputs at runtime which overrides the time-out parameters; and g) tracking users' activeness with respect to the application to override the dynamic timeout parameter. In view of this arrangement of steps, the systems and processes allow for dynamically setting the dynamic timeout parameter at runtime based on user personalized profiles and user behaviors.

It should be understood that, to the extent implementations of the invention collect, store, or employ personal information provided by, or obtained from, individuals (for example, interaction behaviors of an application user), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
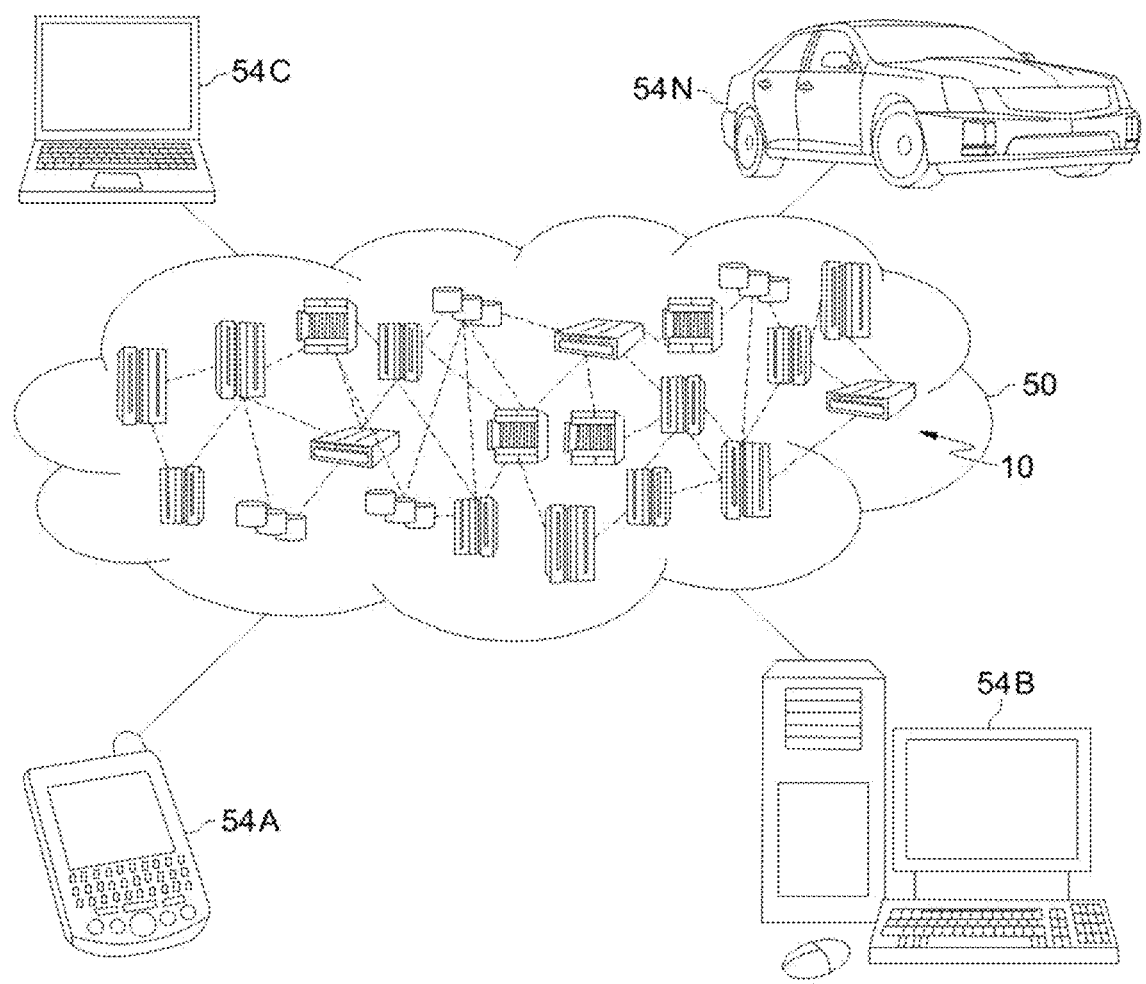
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
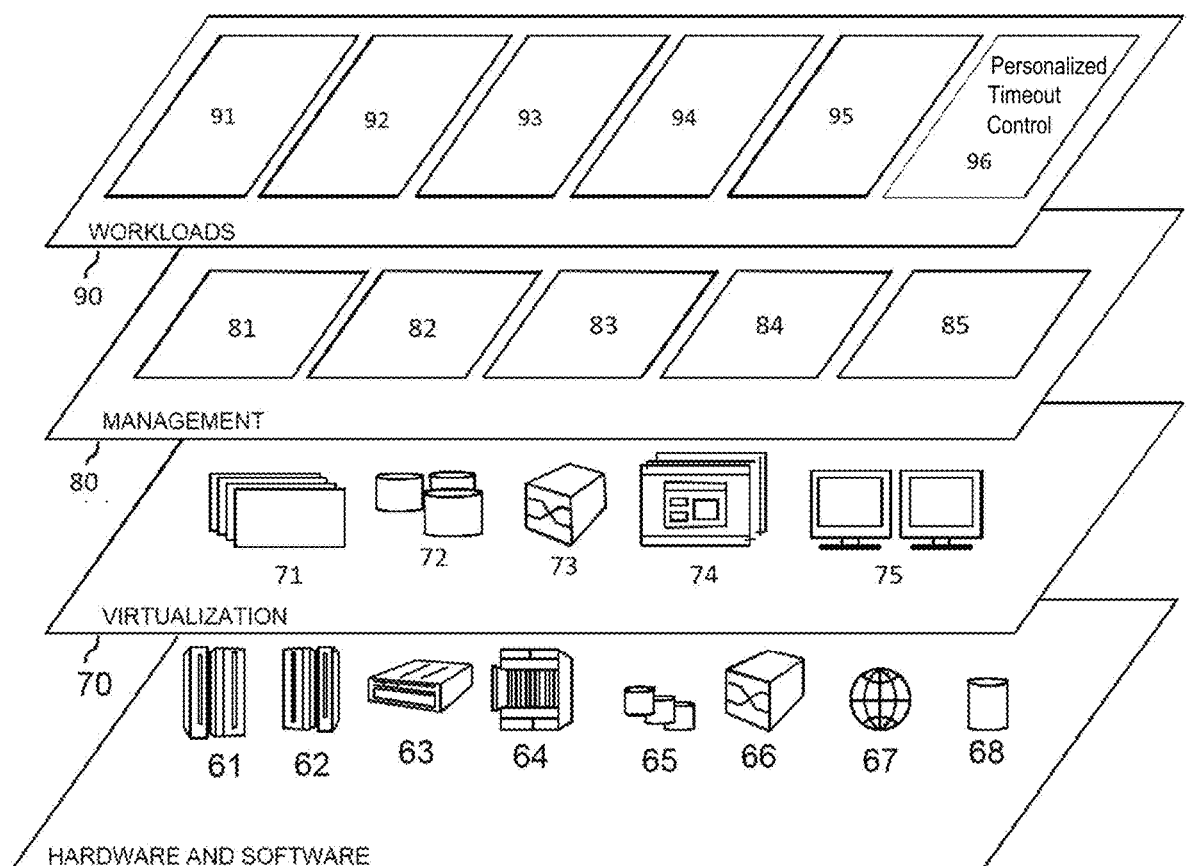
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalized timeout control 96.

Implementations of the invention may include a computer system/server 12 of FIG. 1 in which one or more of the program modules 42 are configured to perform (or cause the computer system/server 12 to perform) one of more functions for the personalized timeout control 96 of FIG. 3. For example, the one or more of the program modules 42 may be configured to: a) use behavioral analytics on user interaction patterns with respect to web services of an application; b) classify a tolerance level in view of these behavioral analytics; c) apply a user contextual analysis to discover a criticality of the application with respect to the user; d) determine the dynamic timeout parameter based on the user tolerance and application criticality with respect to the user; e) create peer-to-peer communications between PTC-SDKs running on different devices for estimating whether the current time-out setting has high probability to get a result back from the application; f) track user inputs at runtime which overrides the time-out parameters; and g) track users activeness with respect to the application to override the dynamic timeout parameter.

Figure 4:
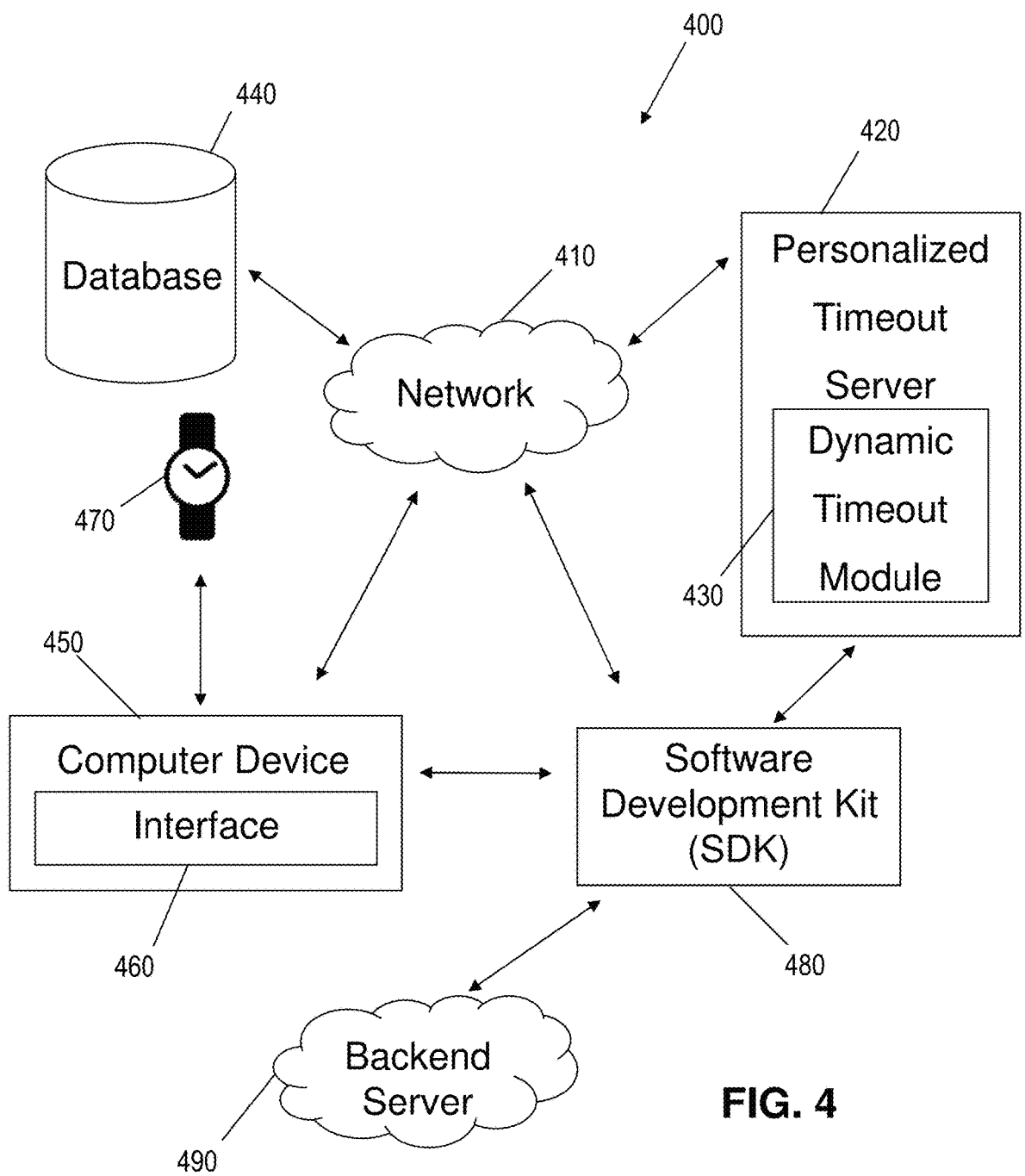
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 410, a personalized timeout server 420, a database 440, a computer device 450, an interface 460 of the computer device 450, a device 470, a software development kit (SDK) 480, and a backend server associated with an application the user is interacting with through the interface 460. The personalized timeout server 420 is a computing device comprising one or more components of computer system/server 12 of FIG. 1. In embodiments, the personalized timeout server 420 includes a dynamic timeout module 430, which includes one or more program modules such as program modules 42 described with respect to FIG. 1. The personalized timeout server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the network 410 is any suitable network including any combination of one or more of a LAN, WAN, or the Internet. In a particular embodiment, the network 410 is representative of a cloud computing environment as described in FIG. 2. The computer device 450 includes one or more components of the computer system 12 of FIG. 1. In one example, the computer device 450 includes smart phones, laptop and desktop computers, tablets, etc. In embodiments, the SDK 480 is a collection of software tools.

In embodiments, a user requests a service from an application through the computer device 450. In embodiments, the application is a mobile application which sends the user request to the backend server 490 for processing and responding to the request. Examples of the mobile application include a ride-sharing application or a banking application, amongst other examples. In a specific example of using the ride-sharing application, the user books a vehicle for transportation for a medical situation. In a specific example of the banking application, the user accesses their banking account through web services of the banking application.

In embodiments, architectures of the application include hardcoded parameters. Examples of hardcoded parameters include parameters encoded in a backend development code, or parameters encoded in a front end code. In embodiments, these parameters are hardcoded for all users of the application and include a hardcoded timeout parameter for terminating the application. As an example, a hardcoded timeout parameter is a static and pre-configured time interval set for several seconds. As a specific example, if the user is waiting for the response from the backend server 490, the application terminates in response to the backend server 490 failing to respond within the pre-configured time interval. However, the hardcoded timeout parameter does not address already logged-in but inactive users of the application which create network traffic on the backend server 490. For example, application sessions of the inactive users may extend for quite some time, thereby causing more load on the backend server 490, and slowing down responses from the backend server 490. In this way, the increased load on the backend server 490 prevents multiple parallel users from using the application, effectively causing a timeout for these multiple users.

In embodiments, the dynamic timeout module 430 changes the hardcoded timeout parameter to a dynamic timeout parameter. In embodiments, the dynamic timeout parameter is a time interval for when to force-exit the application. As an example, the time interval of the dynamic timeout parameter of a particular application may be 30 seconds, while the time interval of the hardcoded timeout parameter for the same application may be 1 minute. Accordingly, the dynamic timeout module 430 changes the hardcoded timeout parameter from 1 minute to 30 seconds. In this example, the application force-exits upon reaching the time interval of 30 seconds. Accordingly, the dynamic timeout module 430 addresses logged-in but inactive users by force-exiting the application for these inactive users prior to reaching the hardcoded timeout parameter. In this way, the dynamic timeout module 430, through the dynamic timeout parameter, optimizes the resources of the application by reducing traffic to the backend server 490. In further embodiments, the dynamic timeout parameter is a completion percentage of information with respect to a workflow progress in the application. As an example, a web service of the application may include an online form for entering information, with the dynamic timeout parameter set for 80% completion before a timeout is permissible. Accordingly, in response to the hardcoded timeout parameter set at a completion percentage lower than 80%, the dynamic timeout module 430 may change the hardcoded timeout parameter to 80% using the SDK 480.

In embodiments, the dynamic timeout module 430 determines the dynamic timeout parameter by determining user behavior from user interaction patterns. In embodiments, the user interaction patterns include active participation of the user with respect to the web services of the application and active participation of the user with respect to the hardware of the computer device 450, amongst other examples. In this way, the dynamic timeout module 430 focuses on a concentration factor of the using the application.

In embodiments, the dynamic timeout module 430 collects a history of interaction data from the user interaction patterns through the network 410. As an example of interaction data, the dynamic timeout module 430 collects an interaction of the user closing the application after waiting a time period "t", which is a shorter amount of time than time period of the hardcoded timeout parameter. In embodiments, the dynamic timeout module 430 stores the history of interaction data within the database 440. In this way, the dynamic timeout module 430 determines that the user closes the application after a time period which is a shorter than a time period of the hardcoded timeout parameter.

In embodiments, determining user behavior includes applying behavioral analytics to the interaction data within the database 440. In embodiments, applying the behavioral analytics comprises using behavioral analytics techniques such as eye tracking techniques and movement capturing techniques, amongst other examples. In view of the behavioral analytics, a machine learning model identifies user behavior. Examples of user behaviors include tap events on buttons within the application for controlling the force-exit of the application, user inactiveness, user biometric data, user health context, and workflow progress, amongst other examples. As an example, the machine learning model learns the user behavior of closing certain advertisements within the application over several examples of interaction data. In view of the user behavior, the machine learning model learns (e.g., classifies) when the user is in an active application state or when the user is in the inactive application state with respect to the application. In embodiments, the active application state includes the user actively interacting with the application. Alternatively, the inactive application state includes the user not interacting with the application. As an example, the machine learning model learns the user is in the active application state since the user is closing advertisements within the application.

In embodiments, the dynamic timeout module 430 classifies a timeout tolerance of the user in view of the behavioral analytics. As an example, the machine learning model may learn in view of the history of interaction data that the user spends a larger amount of time interacting with a specific application. Accordingly, the dynamic timeout module 430 classifies the timeout tolerance level as lower than a timeout tolerance level for interaction data indicating the user spends a smaller amount of time interacting with a different application. In view of the classifying the timeout tolerance level, the dynamic timeout module 430 determines a tolerance level for a timeout for the current application or for another application.

In embodiments, the dynamic timeout module 430 also determines the dynamic timeout parameter by determining application criticality. In embodiments, determining application criticality includes the dynamic timeout module 430 applying contextual analysis to the interaction data within the database 440 for the machine learning model to learn a context of the application. As an example, the contextual analysis may determine that the user uses the ride-sharing application for transportation to a healthcare facility each time the user has used the ride-sharing application. In view of this determined context, the machine learning model learns that the ride-sharing application is critical to the user in view of the health context. As another example, the contextual analysis may determine that the user spends a minimal amount of time interacting with a social media application. In view of this determined context, the machine learning model learns that the social media application is less critical to the user in view of the social context. In embodiments, the dynamic timeout module 430 uses contextual analysis techniques for the contextual analysis of the interaction data. Examples of contextual analysis include word recognition techniques and optical tracking techniques.

In embodiments, the dynamic timeout module 430 determines the dynamic timeout parameter in view of user timeout tolerance and application criticality. For example, if the user is less tolerant for a timeout using this application and the application is less critical, then the dynamic timeout module 430 may change the hardcoded timeout parameter by scaling down the hardcoded timeout parameter by X %. However, if user is more tolerant for a timeout using this application and the application is more critical, then the dynamic timeout module 430 may change the hardcoded timeout parameter by scaling up the hardcoded timeout parameter by X %. In this way, the dynamic timeout parameter takes into account user personalized profiles (e.g., user timeout tolerance and application criticality). In embodiments, the dynamic timeout module 430 changes the hardcoded timeout parameter through the SDK 480.

In embodiments, the dynamic timeout module 430 updates the dynamic timeout parameter when the backend server 490 is busy. In embodiments, the dynamic timeout module 430 performs peer-to-peer communications with SDKs running on different devices to determine whether the current dynamic timeout parameter has a possibility of getting a response back from the backend server 490. In response to determining a possibility of getting a response back from the backend server 490, the dynamic timeout module 430 updates the dynamic timeout parameter through the SDK 480. In one example, the dynamic timeout module 430 may change the hardcoded timeout parameter to 20 seconds. However, upon performing peer-to-peer communications by calling SDKs running on different devices, the dynamic timeout module 430 may determine that the other devices do not get response for over 40 seconds from the backend server 490. Accordingly, in this example, the dynamic timeout module 430 updates the dynamic timeout parameter from 20 seconds to 40 seconds. In further embodiments, the dynamic timeout module 430 automatically shortens the dynamic timeout parameter to save a user from unnecessary waiting.

In embodiments, the dynamic timeout module 430 also updates the dynamic timeout parameter in view of tracking user inputs. In embodiments, tracking user inputs includes the dynamic timeout module 430 tracking an amount of user inputs into the application. In response to determining an amount of user inputs, the dynamic timeout module 430 updates the dynamic timeout parameter through the SDK 480. As an example, the dynamic timeout module 430 determines that the user does a single tap on a loading sign within the application, thereby overriding the dynamic timeout parameter. Accordingly, the dynamic timeout module 430 updates the dynamic timeout parameter by scaling the dynamic timeout parameter up by a specific percentage (i.e., X %). As another example of tracking user inputs, the dynamic timeout module 430 determines a double tap on the loading sign leads to a force-exit of the application immediately.

In embodiments, the dynamic timeout module 430 also updates the dynamic timeout parameter in view of tracking user activeness. In embodiments, tracking user activeness includes the dynamic timeout module 430 determining a distance between the user and the computer device 450, and whether the user is within a maximum allowable distance with respect to the computer device 450. In response to determining the user is outside the maximum allowable distance, the dynamic timeout module 430 updates the dynamic timeout parameter through the SDK 480. In embodiments, tracking user activeness also includes the dynamic timeout module 430 determining a user health condition. In response to determining a user health condition, the dynamic timeout module 430 updates the dynamic timeout parameter through the SDK 480. Examples of the health condition include user drowsiness for prolonged period, or extremely high heartrate, amongst other examples.

In embodiments, the dynamic timeout module 430 determines the current user session to be "inactive" in view of following conditions of user activeness: 1) if the distance between the user and the computer device 450 is greater than the permissible limit; 2) if the user health condition is preventing dedicated focus; 3) if the open session for a given user is undetectable for any activity; or 4) if the user moves to another screen of the interface 460 so that an intended screen of the interface 460 is not receiving network traffic data packets as per a requirement of a given organization. In response to determining the current user session is inactive, the dynamic timeout module 430 updates the dynamic timeout parameter. In further embodiments, the dynamic timeout module 430 checks biometric data of the user (e.g., fingerprints, facial patterns, and voice) and updates the dynamic timeout parameter in response to the biometric data.

Figure 5:
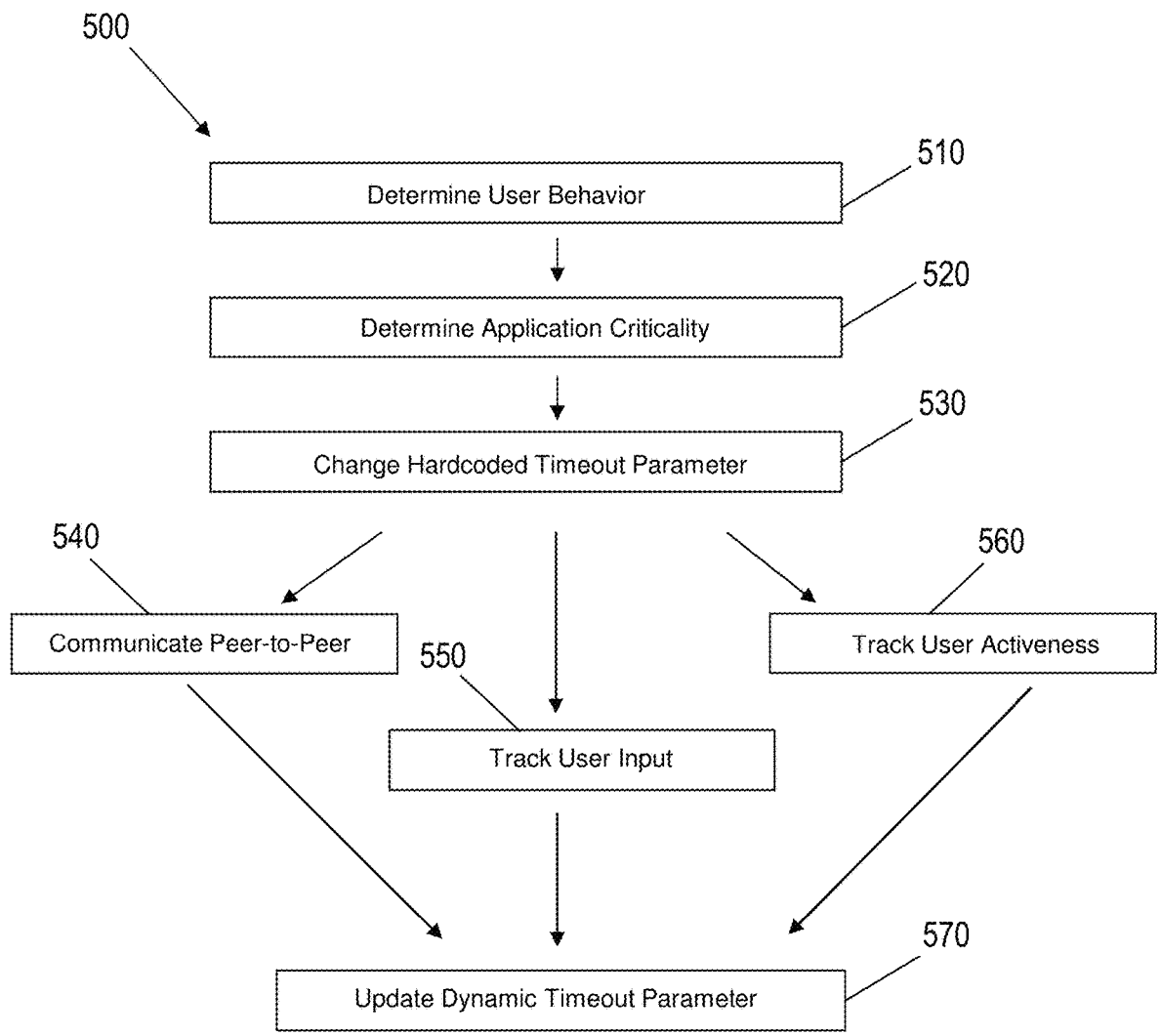
FIG. 5 shows a flowchart of an exemplary method for dynamically changing a timeout parameter in accordance with aspects of the invention.

FIG. 5 shows a flowchart 500 of an exemplary method in accordance with aspects of the invention. Steps of the method may be carried out in the environment of FIG. 4 and are described with reference to elements depicted in FIG. 4.

At step 510, the dynamic timeout module 430 determines user behavior. In embodiments, and as described with respect to FIG. 4, this includes the dynamic timeout module 430 applying behavioral analytics to the interaction data within the database 440. In view of the behavioral analytics, a machine learning model identifies user behavior. In embodiments, the dynamic timeout module 430 classifies a timeout tolerance of the user in view of the behavioral analytics.

At step 520, the dynamic timeout module 430 determines application criticality. In embodiments, and as described with respect to FIG. 4, this includes the dynamic timeout module 430 applying contextual analysis to the interaction data within the database 440 for the machine learning model to learn a context of the application. In view of the application context, the dynamic timeout module 430 determines application criticality.

At step 530, the dynamic timeout module 430 dynamically changes the hardcoded timeout parameter. In embodiments, and as described with respect to FIG. 4, this includes the dynamic timeout module 430 determining a dynamic timeout parameter in view of user timeout tolerance and application criticality. In embodiments, dynamically changing the hardcoded timeout parameter includes scaling the hardcoded timeout parameter up or down by an X % in view of the user timeout tolerance and the application criticality.

At step 540, the dynamic timeout module 430 communicates peer-to-peer with other SDKs of other devices. In embodiments, and as described with respect to FIG. 4, this includes the dynamic timeout module 430 calling SDKs running on different devices, and determining that the other devices do not receive a response from the backend server 490.

At step 550, the dynamic timeout module 430 tracks user input. In embodiments, and as described with respect to FIG. 4, this includes the dynamic timeout module 430 tracking an amount of user inputs into the application. As an example, the dynamic timeout module 430 determines that the user does a single tap or a double tap within the application.

At step 560, the dynamic timeout module 430 tracks user activeness. In embodiments, and as described with respect to FIG. 4, this includes the dynamic timeout module 430 determining a distance between the user and the computer device 450, and whether the user is within a maximum allowable distance with respect to the computer device 450. In further embodiments, tracking user activeness includes the dynamic timeout module 430 determining a user health condition.

At step 570, the dynamic timeout module 430 updates the dynamic timeout parameter. In embodiments, and as described with respect to FIG. 4, this includes the dynamic timeout module 430 updating the dynamic timeout parameter through the SDK 480 in view of steps 540, 550, or 560. In embodiments, the dynamic timeout module 430 updates the dynamic timeout parameter in response to communicating peer-to-peer with other SDKs of other devices and determining that the other devices do not receive a response from the backend server 490. In further embodiments, the dynamic timeout module 430 updates the dynamic timeout parameter in response to tracking an amount of user inputs into the application and determining that the user does a single tap or a double tap within the application. In even further embodiments, the dynamic timeout module 430 updates the dynamic timeout parameter in response to tracking user activeness and determining that the user is outside a maximum allowable distance with respect to the computer device 450

Figure 6:
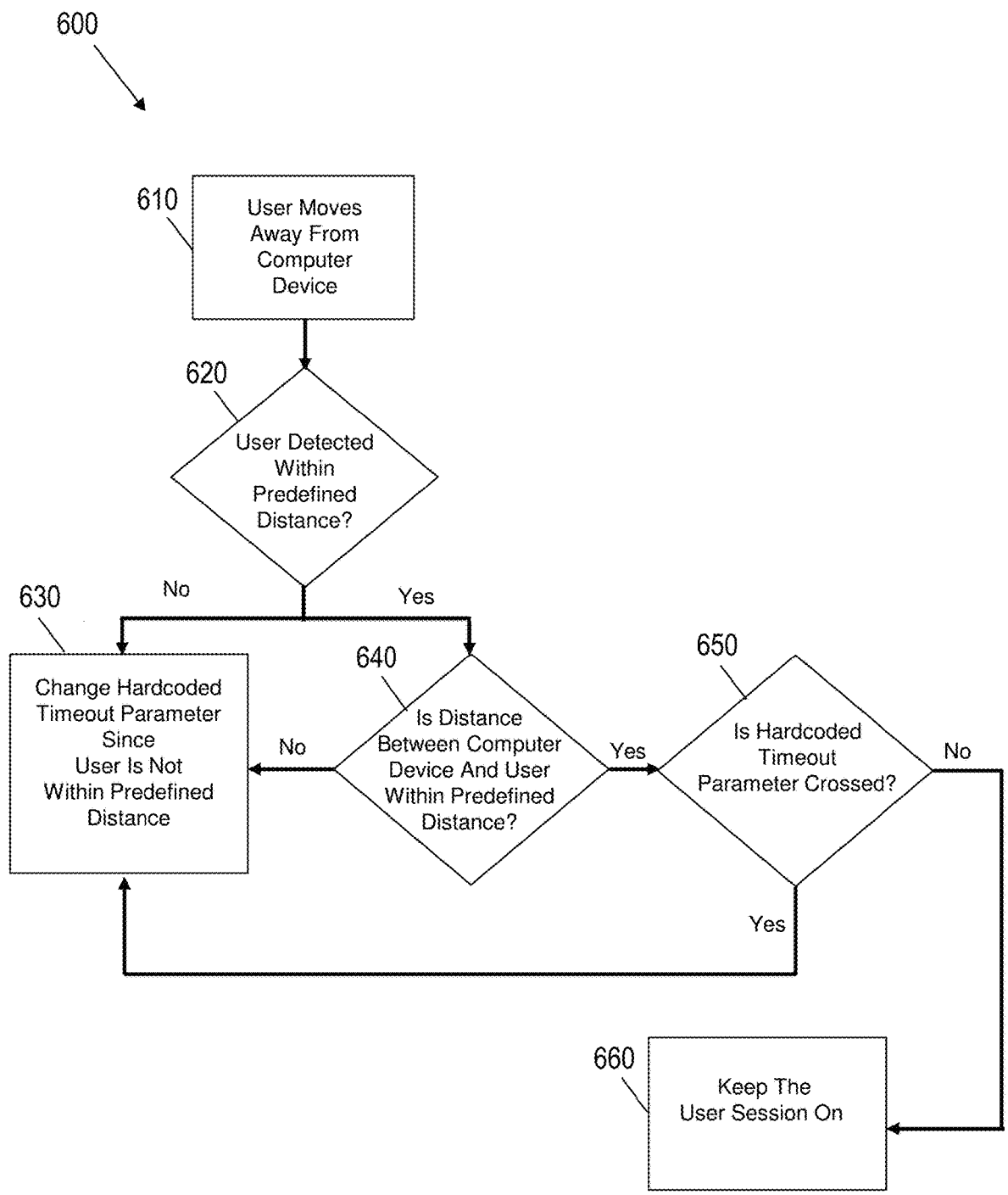
FIG. 6 shows a flowchart of an exemplary method for determining user distance in accordance with aspects of the invention.

FIG. 6 shows a flowchart 600 of an exemplary method for determining user distance in accordance with aspects of the invention. Steps of the method may be carried out in the environment of FIG. 4 and are described with reference to elements depicted in FIG. 4 and the step 560 of tracking user activeness of FIG. 5.

At step 610, the dynamic timeout module 430 determines the user is moving away from the computer device 450. In embodiments, this includes the dynamic timeout module 430 using a proximity sensor attached to the computer device 450, which is attached either externally or internally to the computer device 450. In embodiments, the proximity sensor is a camera. As an example, the dynamic timeout module 430 captures a current image of the user through camera. In a further example, the dynamic timeout module 430 determines a current location of the user by comparing the current image to earlier images of the user showing earlier locations of the user. In view of this comparison, the dynamic timeout module 430 determines whether the user is moving away from the computer device 450.

At step 620, the dynamic timeout module 430 determines whether the user is within a predefined distance with respect to the computer device 450. In embodiments, this includes the dynamic timeout module 430 using the camera to find a distance of the user from the camera and using this distance as the user distance. As an example, the predefined distance is 60 centimeters. In view of the user distance, the dynamic timeout module 430 determines whether the user is within a predefined distance with respect to the computer device 450.

At step 630, in response to determining the user not being detected within the predefined distance, the dynamic timeout module 430 changes the hardcoded timeout parameter to the dynamic timeout parameter since the user is not within a predefined distance. In embodiments, this includes the dynamic timeout module 430 changing the hardcoded timeout parameter using the SDK 480.

At step 640, the dynamic timeout module 430 continues to monitor whether the user is within the predefined distance. In embodiments, this includes the dynamic timeout module 430 using the proximity sensor of the computer device 450 to determine the distance of the user with respect to the computer device 450. In embodiments, if the dynamic timeout module 430 determines that the distance between the computer device 450 and user is not within predefined distance, then the process goes to step 630. Alternatively, if the dynamic timeout module 430 determines that the distance between the computer device 450 and user is within predefined distance, then the process goes to step 650.

At step 650, the dynamic timeout module 430 determines whether the user has crossed the hardcoded timeout parameter. In embodiments, this includes the dynamic timeout module 430 communicating with the SDK 480 and determining whether the user exceeds a threshold of the hardcoded timeout parameter, i.e., crossed. For example, in response to the hardcoded timeout parameter being 60 seconds, the user crosses the hardcoded timeout parameter after a time period of greater than 60 seconds. In another example, the threshold is 5 on a numeric scale of 1-10, and "crossed" covers value being 6 or greater than 6 but does not include 5. In embodiments, if the dynamic timeout module 430 determines that the hardcoded timeout parameter is crossed, then the process returns to step 630 to change the hardcoded parameter to a dynamic timeout parameter. Alternatively, if the dynamic timeout module 430 determines that the hardcoded timeout parameter is not crossed, then the process goes to step 660.

At step 660, the dynamic timeout module 430 keeps the user session on. In embodiments, this includes the dynamic timeout module 430 scaling the hardcoded timeout parameter by X % to keep the user session on.

Figure 7:
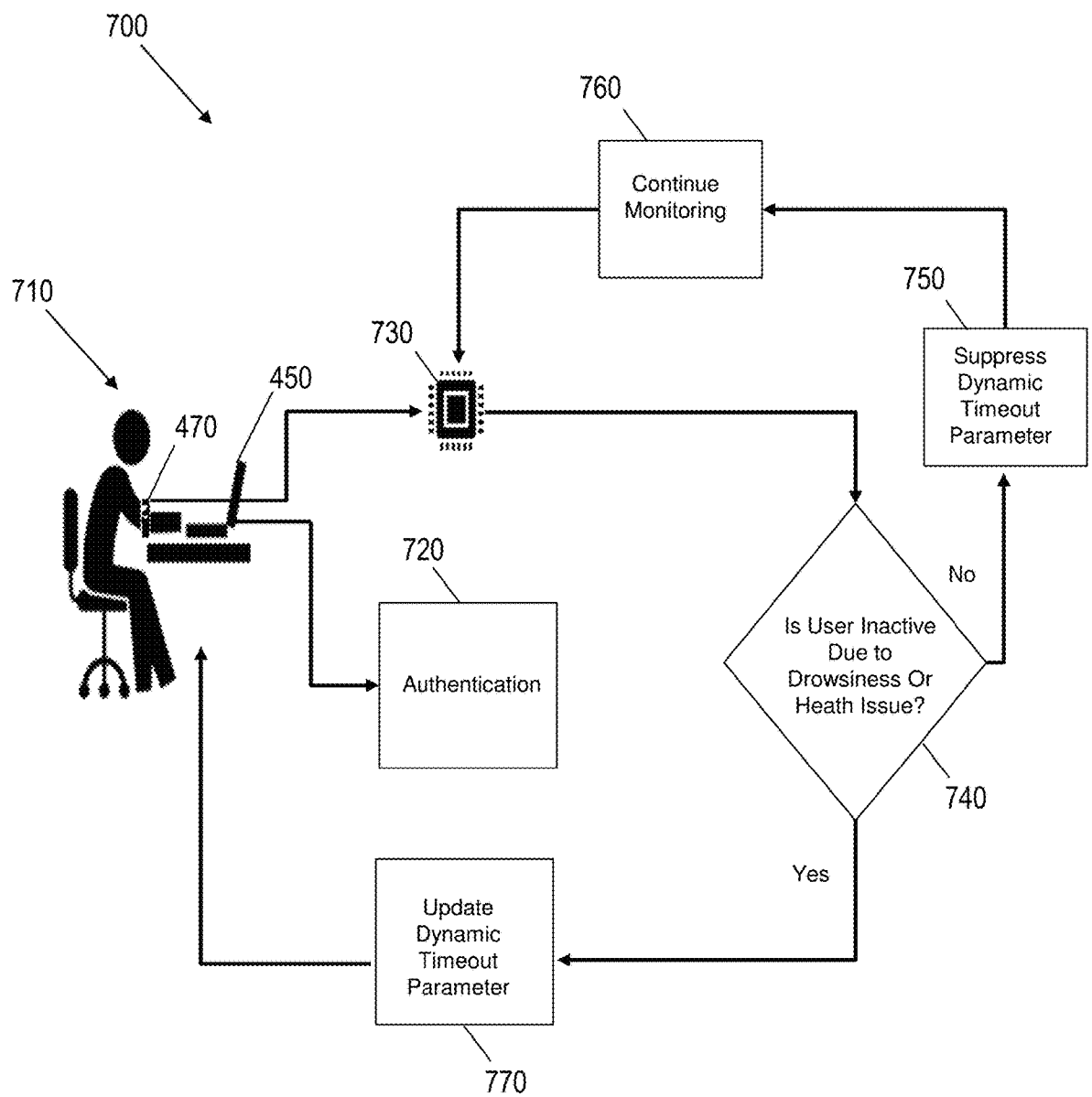
FIG. 7 shows a flowchart of an exemplary method for determining user health in accordance with aspects of the invention.

FIG. 7 shows a flowchart 700 of an exemplary method for determining a user health condition in accordance with aspects of the invention. Steps of the method may be carried out in the environment of FIG. 4 and are described with reference to elements depicted in FIG. 4 and the step 560 of tracking user activeness of FIG. 5.

At step 710, the user interacts with the application through the computer device 450. In embodiments, this includes the user wearing the device 470. In embodiments, the device 470 is a health monitor device. An example of a health monitor device includes a heart rate monitor, amongst other examples.

At step 720, the user authenticates their identity with the application through the computer device 450. In embodiments, this includes the user entering a user ID and password, amongst other examples.

At step 730, the dynamic timeout module 430 obtains continuous health feedback from the device 470. In embodiments, this includes the dynamic timeout module 430 checking the device 470 for user health information. As an example, the device 470 is a heart rate monitor and the user health information includes a heart rate of the user, with the dynamic timeout module 430 checking the device 470 for a current heart rate of the user.

At step 740, the dynamic timeout module 430 determines whether the user is inactive due to user drowsiness or other health issue. In embodiments, this includes the analyzing the health information from the device 470 and determining the user health condition in view of the health information. As an example, the device 470 is a smartwatch having an oximeter. The health information indicates that the user has low oxygen levels. In view of the low oxygen levels, the dynamic timeout module 430 determines that the user is experiencing a health condition, such as user drowsiness. In embodiments, if the dynamic timeout module 430 determines that the that the user is not experiencing a health condition, then the process goes to step 750. Alternatively, if the dynamic timeout module 430 determines that the user is experiencing a health condition, then the process goes to step 770.

At step 750, the dynamic timeout module 430 suppresses the dynamic timeout parameter. In embodiments, this includes the dynamic timeout module 430 updating the dynamic timeout parameter through the SDK 480. As an example, the dynamic timeout module 430 updates the dynamic timeout parameter by scaling up the dynamic timeout parameter by X %.

At step 760, the dynamic timeout module 430 continues monitoring the user for a health condition. In embodiments, this includes the dynamic timeout module 430 checking the health information from the device 470. As an example, the device 470 is a heart rate monitor and the dynamic timeout module 430 checks the device 470 for a current heart rate of the user.

At step 770, the dynamic timeout module 430 updates the dynamic timeout parameter. In embodiments, this includes the dynamic timeout module 430 updating the dynamic timeout parameter through the SDK 480. As an example, the dynamic timeout module 430 updates the dynamic timeout parameter by scaling down the dynamic timeout parameter by X %.

Figure 8:
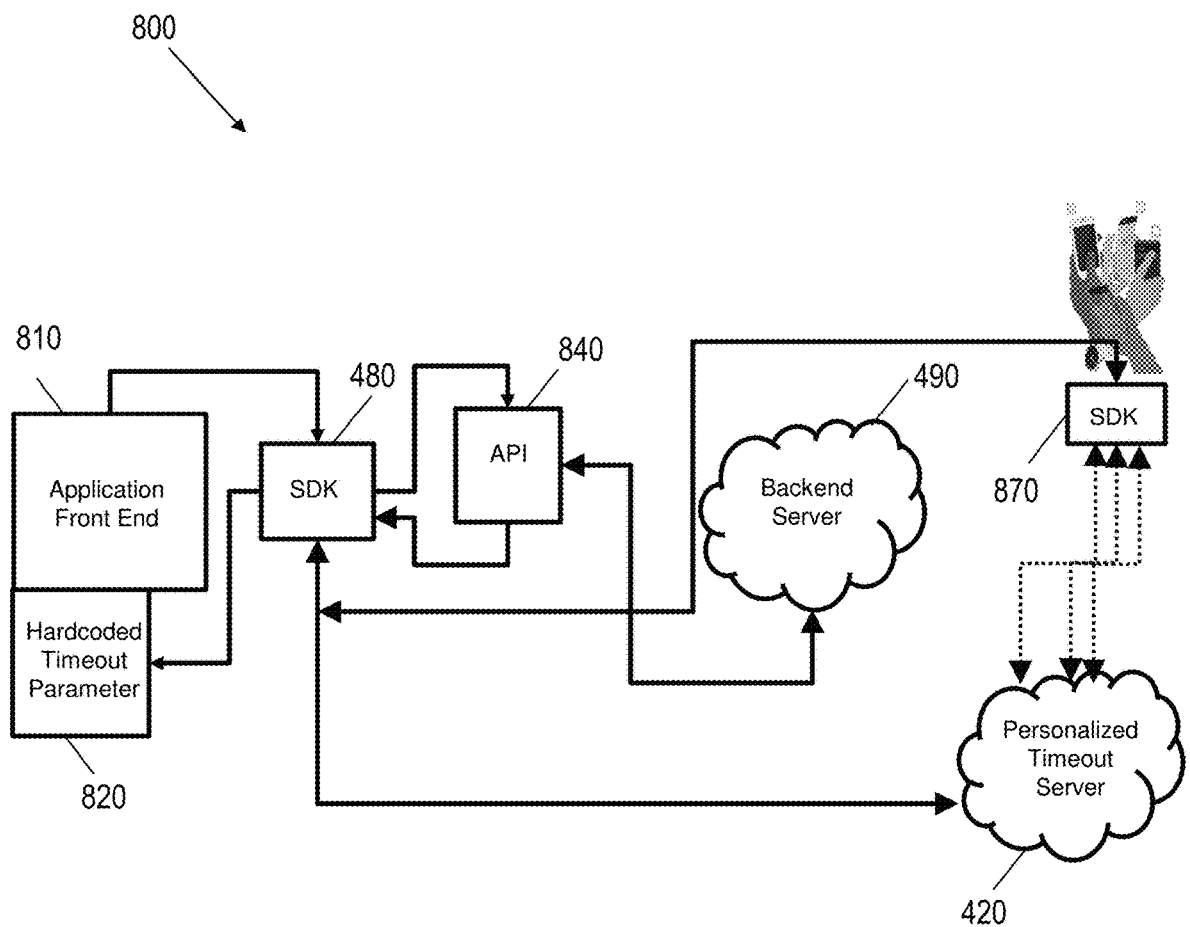
FIG. 8 shows an exemplary use of dynamically changing a timeout parameter in accordance with aspects of the invention.

FIG. 8 illustrates an exemplary use case 800. In embodiments and as described with respect to FIG. 4, the user interacts with an application 810, which includes a hardcoded timeout parameter. In embodiments, the SDK 480 is an intermediary between the application 810 and the back-end server 490, and is in direct communication with the application programming interface (API 840). In embodiments, the API is an interface for accessing the various web services of the application 810. In embodiments, the personalized timeout server 420 through the dynamic timeout module 430 instructs the SDK 480 to change the hardcoded timeout parameter. In further embodiments, the SDK 480 and the personalized timeout server 420 communicate through peer-to-peer communications with other SDKs 870 on other devices.

Figure 9:
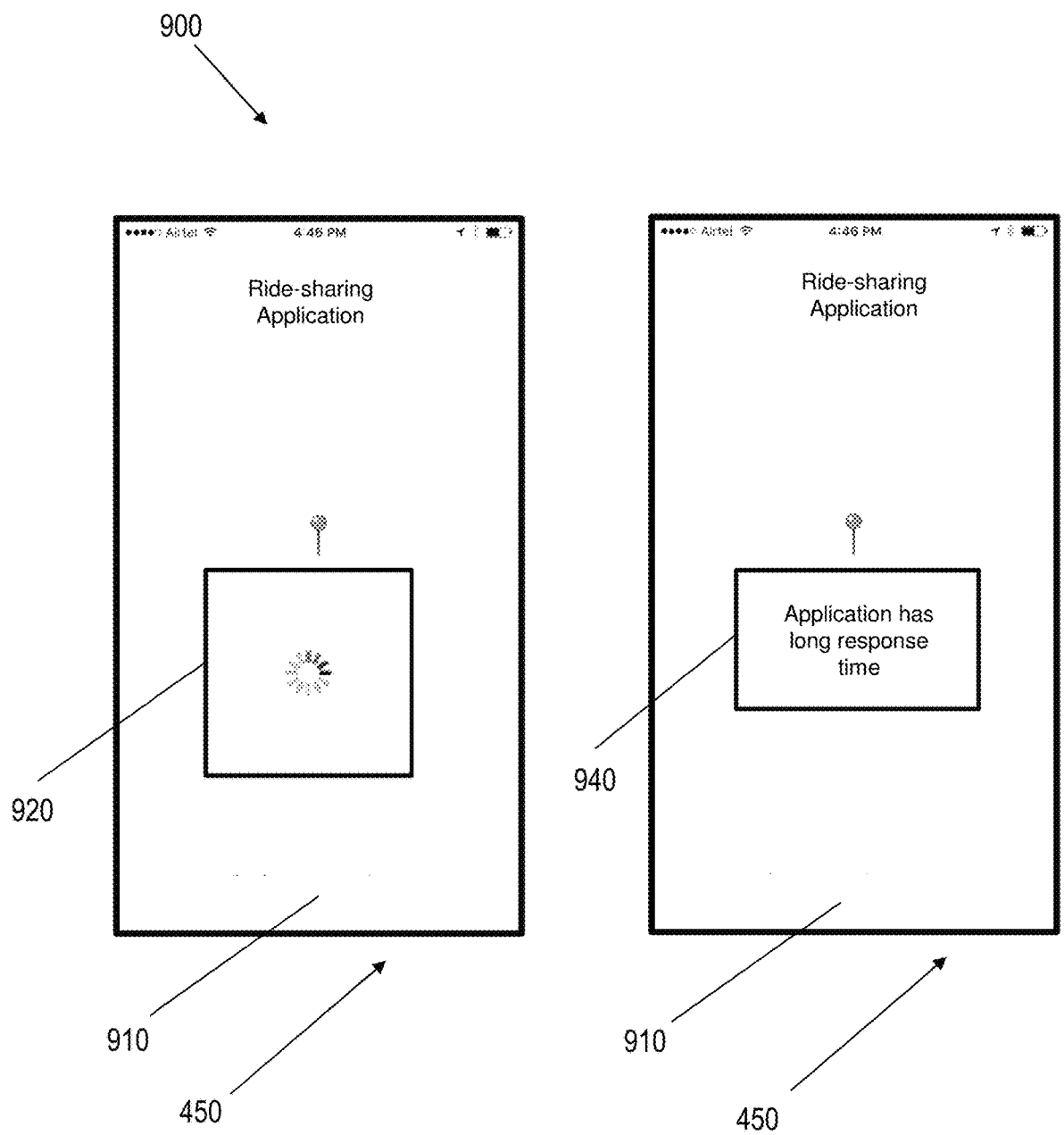
FIG. 9 shows an exemplary use of a ride-sharing application in accordance with aspects of the invention.

FIG. 9 illustrates an exemplary use case 900 of a ride-sharing application 910. In embodiments and as described with respect to FIG. 4, the user requests a vehicle for transportation in a medical situation through the interface 460 of the computer device 450. In embodiments, the user experiences a loading 920 while the user waits for a response from the backend server 490. In view of the loading, the dynamic timeout module 430 communicates through peer-to-peer communications with other SDKs on other devices and determines that the wait time for a response is greater than a hardcoded timeout parameter. In response to this determination, the dynamic timeout module 430 displays a notification 940 regarding the status of the response from the backend server 490.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining, by a computer device, user behavior with an application;
    determining, by the computer device, a criticality of the application to a user; and
    changing, by the computer device, a hardcoded timeout parameter of the application into a dynamic timeout parameter based on the determined user behavior and the determined criticality of the application.

2. The method of claim 1, further comprising:
    tracking, by the computer device, user inputs into the application; and
    updating, by the computer device, the dynamic timeout parameter in response to the user inputs.

3. The method of claim 1, further comprising:
    checking, by the computer device, biometric data of the user; and
    updating, by the computer device, the dynamic timeout parameter in response to the biometric data.

4. The method of claim 1, further comprising:
    tracking, by the computer device, user activeness to the application by detecting the user within a predefined distance of a computer displaying the application; and
    updating, by the computer device, the dynamic timeout parameter in response to the user activeness.

5. The method of claim 1, further comprising updating, by the computer device, the dynamic timeout parameter in response to the user being within a predefined distance of a computer displaying the application.

6. The method of claim 1, further comprising:
    determining, by the computer device, whether the hardcoded timeout parameter is crossed; and
    changing, by the computer device, the hardcoded timeout parameter into the dynamic timeout parameter in response to the crossed hardcoded timeout parameter.

7. The method of claim 1, further comprising:
    determining, by the computer device, a health condition of the user; and
    updating, by the computer device, the dynamic timeout parameter in response to the health condition.

8. The method of claim 1, wherein the user behavior includes tap events on buttons within the application for controlling a force-exit of the application.

9. The method of claim 1, wherein the user behavior includes a user health context.

10. The method of claim 1, wherein the dynamic timeout parameter represents a percentage of completion of the application.

11. The method of claim 1, further comprising:
    determining, by the computer device, user drowsiness; and
    updating, by the computer device, the dynamic timeout parameter in response to the determined user drowsiness.

12. The method of claim 1, further comprising:
    continuously monitoring, by the computer device, a health condition of the user;
    determining, by the computer device, whether the user is experiencing a health issue; and
    updating, by the computer device, the dynamic timeout parameter in response to the user experiencing the health issue.

13. A computer program product comprising one or more computer readable storage media having program instructions collectively stored on the one or more computer readable storage media, the program instructions executable to:
    determine user behavior with an application;
    determine a criticality of the application to the user;
    change a hardcoded timeout parameter of the application into a dynamic timeout parameter based on the determined user behavior and the determined criticality of the application; and
    update the dynamic timeout parameter.

14. The computer program product of claim 13, wherein the program instructions are executable to suppress the dynamic timeout parameter.

15. The computer program product of claim 13, wherein the program instructions are executable to:
    monitor the user for a health condition;
    determine whether the user is experiencing a health issue; and
    updating, by the computer device, the dynamic timeout parameter in response to the user experiencing the health issue.

16. The computer program product of claim 15, wherein the program instructions are executable to:
    classify the user behavior in view of timeout tolerance; and
    determining a user tolerance for a timeout with respect to the application.

17. A system comprising:
    a processor, a computer readable memory, one or more computer readable storage media, and program instructions collectively stored on the one or more computer readable storage media, the program instructions executable to:
    determine user behavior with an application;
    determine a criticality of the application to the user;
    change a hardcoded timeout parameter of the application into a dynamic timeout parameter based on the determined user behavior and the determined criticality of the application; and
    update the dynamic timeout parameter.

18. The system of claim 17, wherein the program instructions are executable to change a time interval of the hardcoded timeout parameter.

19. The system of claim 17, wherein the program instructions are executable to:
    collect interaction data from the application; and
    determine that the user closes the application after a time period which is a shorter than a time period of the hardcoded timeout parameter.

20. The system of claim 19, wherein the program instructions are executable to:
    apply a contextual analysis to interaction data from the application; and
    determine a criticality of the application to the user for scaling of the dynamic timeout parameter.

* * * * *